(12) United States Patent
Rutkowski et al.

(10) Patent No.: US 10,369,856 B2
(45) Date of Patent: Aug. 6, 2019

(54) SUSPENSION DAMPER TEMPERATURE COMPENSATION SYSTEMS AND METHODS

(71) Applicant: FORD GLOBAL TECHNOLOGIES, LLC, Dearborn, MI (US)

(72) Inventors: Brian D. Rutkowski, Ypsilanti, MI (US); David John Rutkowski, Grosse Ile, MI (US)

(73) Assignee: FORD GLOBAL TECHNOLOGIES, LLC, Dearborn ( * ) Notice: Subject to any disclaimer, the term of this patent is extended or adjusted under 35 U.S.C. 154(b) by 96 days.

(21) Appl. No.: 14/963,336

(22) Filed: Dec. 9, 2015

(65) Prior Publication Data

US 2017/0166027 A1    Jun. 15, 2017

(51) Int. Cl.
| | | |
|---|---|---|
| *B60G 13/06* | (2006.01) | |
| *B60G 17/00* | (2006.01) | |
| *B60G 17/08* | (2006.01) | |

(52) U.S. Cl.
CPC ........... *B60G 17/002* (2013.01); *B60G 13/06* (2013.01); *B60G 17/08* (2013.01); *B60G 2400/20* (2013.01); *B60G 2400/252* (2013.01); *B60G 2400/7162* (2013.01); *B60G 2400/8422* (2013.01); *B60G 2400/91* (2013.01); *B60G 2500/10* (2013.01); *B60G 2800/162* (2013.01)

(58) Field of Classification Search
None
See application file for complete search history.

(56) References Cited

U.S. PATENT DOCUMENTS

| | | | | |
|---|---|---|---|---|
| 5,200,895 | A | | 4/1993 | Emura et al. |
| 5,255,191 | A | * | 10/1993 | Fulks ................ B60G 17/018 280/5.515 |
| 5,282,645 | A | * | 2/1994 | Spakowski ............ F16F 9/46 137/854 |
| 5,555,500 | A | | 9/1996 | Ogawa et al. |
| 5,579,229 | A | * | 11/1996 | Maguran, Jr. ........ B60G 17/002 280/5.504 |
| 5,687,098 | A | * | 11/1997 | Grumstrup ......... G05B 23/0202 137/487.5 |
| 5,788,028 | A | | 8/1998 | Bieber |
| 6,219,601 | B1 | * | 4/2001 | Shono ................ B60G 17/016 701/36 |
| 6,892,864 | B2 | * | 5/2005 | Iyengar ................ F16F 9/535 188/276 |
| 9,527,364 | B2 | * | 12/2016 | Mohamed ............ B60G 17/019 |

(Continued)

FOREIGN PATENT DOCUMENTS

| | | |
|---|---|---|
| JP | 05016632 A | 1/1993 |
| JP | 08104122 A | 4/1996 |

(Continued)

*Primary Examiner* — Nicholas K Wiltey
(74) *Attorney, Agent, or Firm* — Jones Robb, PLLC; Raymond Coppiellie (57) ABSTRACT

A damper control system includes a controller configured to estimate a temperature of a damper fluid based on data relating to heat added to and heat removed from the fluid. At least one damper is operatively coupled to the controller, and the controller is configured to control a size of a damper flow path of the at least one damper based on the estimated temperature. Methods relate to controlling at least one damper based on an estimated temperature of a damper fluid.

22 Claims, 5 Drawing Sheets

(56) References Cited

U.S. PATENT DOCUMENTS

2008/0140285 A1* 6/2008 Sekiya ................. B60G 17/018
                                                                    701/38
2014/0151169 A1* 6/2014 Wehr ........................ F16F 9/52
                                                                    188/269

FOREIGN PATENT DOCUMENTS

| JP | 2009023595 A | 2/2009 |
|----|--------------|--------|
| JP | 5089897 B2   | 9/2012 |

* cited by examiner

SUSPENSION DAMPER TEMPERATURE COMPENSATION SYSTEMS AND METHODS

TECHNICAL FIELD

The present disclosure relates generally to systems configured to estimate a damper fluid temperature and to adjust a damping force of a vehicle damper based on the estimated damper fluid temperature.

BACKGROUND

Vehicle suspension systems include resilient devices configured to absorb forces such as road shock and other vibrations while providing a smooth and comfortable ride for vehicle occupants. Such devices may include springs, such as coil springs, leaf springs, torsion bars, etc. configured to store such forces by compression and/or extension, and dampers configured to dissipate the forces by dampening oscillation of the springs.

Such dampers may operate by forcing a damper fluid (e.g., oil) through an orifice in a piston. The damping force generated by the damper may depend at least in part on the size (e.g., diameter) of the orifice and on the viscosity of the damper fluid. The damping characteristics of the damper may be affected by the ambient conditions in which the vehicle is operated. For example, under low temperature ambient conditions, the damper fluid may also have a low temperature, and as a result, have a relatively higher viscosity. The higher viscosity of the damper fluid may result in higher damping forces and a correspondingly rougher (e.g., harsh) ride for vehicle occupants.

It is desirable to provide a system for reducing (e.g., eliminating) variations in damping force and ride comfort resulting from temperature variations in the damper fluid.

SUMMARY

In accordance with various exemplary embodiments, the present disclosure provides a method of controlling a vehicle damper. The method includes estimating, with a vehicle controller, a temperature of a fluid of the vehicle damper based on data relating to heat added to the fluid and data relating to heat lost from the fluid, and controlling a size of at least one fluid flow path of the vehicle damper based on the estimated temperature of the fluid of the vehicle damper.

In accordance with various exemplary embodiments, a damper control system includes a controller configured to estimate a temperature of a damper fluid based on data relating to heat added to and heat removed from the fluid and at least one damper operatively coupled to the controller. The damper control system may estimate the temperature of the damper fluid based on inputs from sensors not in contact with the damper fluid. The controller is configured to control a size of a damper flow path of the at least one damper based on the estimated temperature.

In accordance with various exemplary embodiments, a vehicle may include a suspension control system comprising a suspension damper and a controller. The controller may include a damping force calculation module configured to output a signal relating to a desired damping force, a temperature estimation module configured to provide an estimated damper fluid temperature, a temperature compensation module configured to output a temperature compensation signal relating to the estimated damper fluid temperature, and a damping force control module configured to adjust a parameter of the suspension damper based on the desired damping force signal and the temperature compensation signal.

The accompanying drawings, which are incorporated in and constitute a part of this specification, illustrate embodiments of the present disclosure and together with the description, serve to explain the principles of the present disclosure.

BRIEF DESCRIPTION OF THE DRAWINGS

At least some features and advantages will be apparent from the following detailed description of embodiments consistent therewith, which description should be considered with reference to the accompanying drawings, wherein.

Although the following detailed description makes reference to illustrative embodiments, many alternatives, modifications, and variations thereof will be apparent to those skilled in the art. Accordingly, it is intended that the claimed subject matter be viewed broadly.

DESCRIPTION OF THE EMBODIMENTS

Reference will now be made in detail to various embodiments, examples of which are illustrated in the accompanying drawings. However, these various exemplary embodiments are not intended to limit the disclosure. To the contrary, the disclosure is intended to cover alternatives, modifications, and equivalents. In the drawings and the description, similar elements are provided with similar reference numerals. The features explained individually in the description can be mutually combined in any technically expedient manner and disclose additional embodiments of the present disclosure.

The present disclosure relates to systems and methods configured to reduce (e.g., eliminate) variations in damping force resulting from temperature variations of the damper fluid. In particular, methods of the disclosure include estimating a temperature of the damper fluid by estimating a starting temperature of the damper fluid, estimating a rate of heat added to the damper fluid, estimating a rate of heat lost from the damper fluid, and estimating a new temperature of the damper fluid based on the estimated rate of heat lost from the damper fluid and the estimated rate of heat added to the damper fluid. The temperature of the damper fluid may be estimated using inputs from sensors not in physical contact (e.g., not in direct contact) with the damper or damper fluid. The estimated temperature of the damper fluid may be used to control a size and/or number of one or more flow passages of the damper to alter damping force.

Systems of the disclosure include a controller that may include a damper force calculation module, a damper force control module, a temperature estimation module, and a temperature compensation module. Data collected from various sensors may form inputs to the damper force calculation module and the temperature estimation module. An estimated temperature signal from the temperature estimation module may be transmitted to a temperature compensation module. Outputs from the damper force calculation module and the temperature compensation module may be transmitted to a damper force control module, which may adjust a damping force of the damper based on the signals from the damper force calculation module and the temperature compensation module.

Systems and methods of the disclosure may be implemented entirely in software and/or firmware in existing vehicle control systems. In other words, the functions of the damper force calculation module, the temperature estimator module, the temperature compensator module, and the damper control module may be carried out by one or more controllers (e.g., central processing units) of the vehicle, such as an electronic control unit (ECU), in communication with various existing vehicle sensors. Systems and methods of the disclosure may provide damper force temperature compensation without requiring temperature sensors in contact with the damper fluid or damper components.

Figure 1:
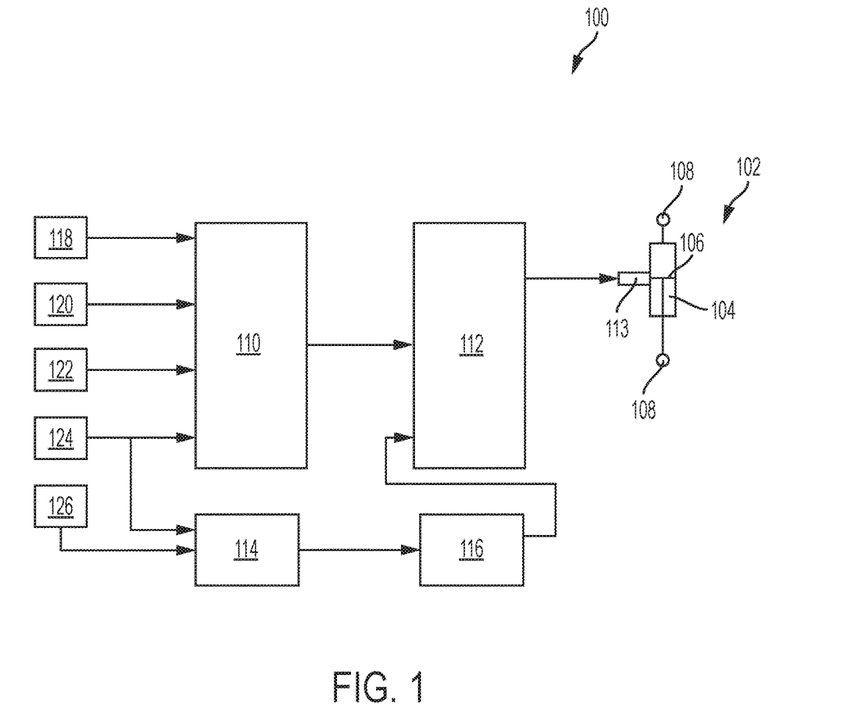
FIG. 1 is a schematic view of a vehicle damper and associated control system in accordance with an exemplary embodiment of the disclosed subject matter.

FIG. 1 shows a schematic diagram of a control system 100 for a suspension damper 102 of a vehicle (not shown). The suspension damper 102 may be, e.g., a hydraulic damper forming a portion of a suspension of the vehicle. For example, the suspension damper 102 may be configured absorb (e.g., dissipate) oscillatory motion generated by springs of the vehicle suspension in response to vehicle wheels encountering irregularities along the surface over which the vehicle travels. In some embodiments, the suspension damper 102 may be a hydraulic damper, such as a dashpot damper. For example, the vehicle suspension damper may include a fluid-filled (e.g., oil-filled) cylinder 104 within which a piston 106 moves. The piston 106 and/or other components of the suspension damper 102 may include one or more flow paths (e.g., orifices or other fluid passages (not shown)) through which fluid flows during movement of the piston 106. Friction (i.e., resistance to flow) of the fluid through the flow paths causes energy from movement of the suspension to be dissipated as heat. A damping force generated by the vehicle suspension damper 102 may be dependent at least in part on the size (e.g., diameter) and number of the flow paths (not shown) in the damper as well as on the viscosity of the damper fluid, which may be, for example, a mineral-based, petroleum-based, or synthetic oil. The suspension damper 102 may include mounting components 108 for attaching the vehicle suspension damper 102 between a frame of the vehicle and a suspension member, such as a control arm, of the vehicle.

Certain operating conditions may result in undesirable variations in damping force generated by the suspension damper 102. For example, under low temperature ambient air conditions (e.g., below 0 degrees Celsius, below −18 degrees Celsius, etc.), the damper fluid may have a correspondingly low temperature and a resulting high viscosity, leading to higher than desired damping forces. The control system 100 may be configured to adjust a damping force generated by the vehicle suspension damper 102 to compensate for temperature-related variations in damper fluid viscosity. In particular, the control system 100 may be configured to maintain a damping force generated by the suspension damper at or close to (e.g., within about 10% or less, within about 20% or less, within about 50% or less, etc.) a particular nominal (e.g., desired) damping force value regardless of a temperature of the damper fluid.

In some embodiments, the control system 100 may be configured to estimate a temperature of the damper fluid of the suspension damper 102 by estimating a starting temperature of the damper fluid of the suspension damper 102, estimating a rate of heat lost from the damper fluid, and estimating a rate of heat added to the damper fluid. A real-time and/or or periodic estimate of the temperature of the damper fluid may be obtained based on a known heat capacity (e.g., specific heat multiplied by mass) of the damper fluid and the rate of heat transfer to and from the damper fluid. Based on the estimated temperature of the damper fluid, the control system 100 may adjust a damping force generated by the suspension damper 102 by altering a number and/or size of the fluid paths (not shown) within the damper 102. In other words, the system 100 may identify a desired damping force, estimate a temperature of the damper fluid, and compensate for any variation in temperature from a nominal operating temperature by adjusting the resistance to the flow of fluid through the suspension damper 102. The temperature of the damper fluid may be estimated based on inputs from various sensors, which may or may not be in direct contact with the damper 102 or damper fluid.

In some exemplary embodiments, the control system 100 may include a damper force calculation module 110, a damper force control module 112, a temperature estimation module 114, and a temperature compensation module 116. While the damper force calculation module 110, damper force control module 112, temperature estimation module 114, and temperature compensation module 116 are represented individually in FIG. 1, the functions described below of the various modules may be carried out by one or more processors programmed with one or more software and/or firmware routines. For example, a controller such as a CPU of an electronic control unit (ECU) of the vehicle may be programmed to carry out the functions of the damper force calculation module 110, the damper force control module 112, the temperature estimation module 114, and the temperature compensation module 116. Stated another way, the damper force calculation module 110, the damper force control module 112, the temperature estimation module 114, and the temperature compensation module 116 may represent functions implemented in software in an ECU or other controller of the vehicle. Such an ECU may include, without limitation, a microprocessor and a data storage media such as read-only memory (ROM), random access memory (RAM), etc. In other embodiments, the functions represented by one or more of the damper force calculation module 110, damper force control module 112, temperature estimation module 114, and temperature compensation module 116 may be performed by a separate hardware component (e.g., processor, memory, etc.) operatively connected to other electrical components of the system 100.

The damper force calculation module 110 may be configured to generate a signal representing a desired damping force based on one or more inputs relating to operational parameters of the vehicle of which the control system 100 forms a part. For example, the damper force calculation module 110 may receive data relating to one or more of vehicle speed, steering angle, lateral acceleration, yaw rate, longitudinal acceleration, wheel height of individual wheels, and other operational parameters. Such data may be collected by various sensors operatively connected to the damper force calculation module 110. For example, the vehicle may include one or more of a vehicle speed sensor 118, a steering angle sensor 120, one or more accelerometers 122, one or more wheel height sensors 124 associated with one or more wheels of the vehicle, and/or other sensors. Information (e.g., data) from each sensor may be processed by the damping force calculation module 110 to generate a signal representing a desired level of damping force, which may also be characterized as a nominal damping force. As a non-limiting example, the damping force calculation module 110 may be configured to increase the desired damping force under one or more conditions such as relatively high lateral acceleration, yaw rate, and steering wheel angle to improve steering response and stability of the vehicle.

The signal representing the desired damping force may be transferred from the damper force calculation module 110 to the damper force control module 112. The damper force control module 112 may output a signal to a control mechanism 113 of the damper 102. The control mechanism 113 may be configured to respond to the signal from the damper force control module 112 by altering the size and/or number of fluid passages of the damper 102 through which the damper fluid may flow, thus altering the damping force generated by the damper 102. In some embodiments, the control mechanism 113 may be or include a solenoid, stepper motor, or other electromechanical device operable to adjust a resistance to fluid flow through the fluid path(s) of the damper by, e.g., increasing a cross-sectional size of the flow path(s) and/or increasing the number of flow paths.

The temperature estimation module 114 may be configured to estimate a temperature of a damper fluid of the suspension damper 102 based on data inputs related to various vehicle operating conditions. For example, in the embodiment of FIG. 1, the temperature estimation module 114 may receive an input from an ambient temperature sensor 126. The ambient temperature sensor 126 may be any ambient temperature sensor associated with an electrical and/or control system of the vehicle. For example, the ambient temperature sensor 126 may be associated with an outside air temperature indicator located in a passenger cabin of the vehicle, an air temperature sensor for a fuel injection system of the vehicle, etc. The ambient temperature sensor 126 may be physically separated from the suspension damper 102 and may, for example, be positioned in the vehicle at a location distant from the suspension damper 102.

The temperature estimation module 114 may be configured to estimate a temperature of the damper fluid based on information including an initial estimated temperature of the damper fluid, an estimated rate of heat added to the damper fluid, and an estimated rate of heat lost from the damper fluid. Operation of the vehicle may result in heat being added to the damper fluid through frictional losses as the damper fluid flows through the fluid passages of the suspension damper 102. Stated differently, work done on the damper fluid by suspension oscillation when the vehicle is in motion is dissipated in the damper fluid as heat. The temperature estimation unit 114 may be configured to estimate the rate of heat added to the damper fluid based on one or both of a frequency of oscillation of the wheel height and an amplitude of oscillation of the wheel height, as indicated by the one or more wheel height sensors 124. Both greater frequency of oscillation and greater amplitude of oscillation may result in greater work being done by the damper in dissipating the energy generated by articulation of the suspension of the vehicle, and accordingly, more heat being added to the damper fluid.

The temperature estimation module 114 may be configured to associate a frequency and/or amplitude of oscillation of the wheels with the estimated rate of heat added to the damper fluid. For example, the temperature estimation module 114 may include data in read-only memory (ROM) that relates the frequency and/or amplitude of oscillation of the wheels with the rate of heat added to the damper fluid. Such data may be correlated to a temperature increase of the damper fluid based on a known specific heat capacity and mass of the damper fluid. In some embodiments, the temperature estimation module 114 may include a map of stored values that correlates the frequency and/or amplitude of wheel height movements with the rate of heat added to the damper fluid. Additionally or alternatively, the temperature estimation module 114 may be configured to perform real-time calculations using information from the wheel height sensors as data inputs to numerical equations based on empirical and/or theoretical heat transfer models.

The temperature estimation module 114 may also be configured to estimate heat lost from the damper fluid based on vehicle operating conditions. For example, the temperature estimation module 114 may be configured to estimate heat lost from the damper fluid by conduction through components of the damper (e.g., damper cylinder 104) to the ambient environment. In some embodiments, the temperature estimation module 114 may include data in read-only memory that correlates ambient air temperature with the rate of heat loss from the damper fluid. For example, a map of values of ambient air temperature correlated to rates of heat loss from the damper fluid may be stored in, e.g., read-only memory (ROM) of the temperature estimation module 114. Additionally or alternatively, the temperature estimation module 114 may be configured to provide a real-time calculation of estimated heat loss from the damper fluid using ambient temperature as an input to one or more numerical equations based on empirical and/or theoretical heat transfer models.

In some embodiments, the temperature estimation module 114 may be configured to generate an initial estimate of the temperature of the damper fluid based on operating conditions of the vehicle. For example, the temperature estimation module 114, or another module of the control system 100, may include a vehicle-off condition timer configured to measure a period of time in which the vehicle ignition is in the "off" position. An extended period of time (e.g., 2 hours, 4 hours, etc.) may indicate that the temperature of the damper fluid may approach, or be equal to, the ambient temperature sensed by the ambient air temperature sensor 126, as heat is conducted to or from the damper fluid. When the ignition is started, the temperature estimation module 114 may begin processing information related to the rate of heat added to the damper fluid through oscillations of the wheel and continue calculating rate of heat lost from the damper fluid based on ambient temperatures, as described above. The temperature estimation module 114 may process the data related to initial temperature, heat addition rate, and heat loss rate to provide an estimated operating temperature of the damper fluid. Such an estimated operating temperature may be updated periodically, such as every second, every 30 seconds, every minute, etc. Alternatively, the estimated operating temperature may be updated in real-time (i.e., constantly).

A signal based on the damper fluid temperature estimated by the temperature estimation module 114 may be transmitted to the temperature compensation module 116. The temperature compensation module 116 may be configured to generate a compensation signal based on the estimated temperature. For example, memory (e.g., ROM) of the temperature compensation table may include a look-up table comprising compensation factors corresponding to different estimated temperature values. As described in greater detail below in connection with FIG. 3, the temperature compensation module 116 may output a discrete compensation signal for a given range of estimated temperatures. For example, the compensation signal may be represented as a non-continuous function of the estimated temperature. In some embodiments, the damper compensation module 116 may be configured to generate a discrete compensation signal value for each estimated temperature input. In such embodiments, the compensation signal may be represented as a substantially continuous function of the estimated temperature.

The temperature compensation signal from the temperature compensation module 116 may be transmitted to the damper force control module 112. The damper force control module 112 may send a signal to the damper control mechanism 113 based on the signals from the damper force calculation module 110 and the temperature compensation module 116. For example, if the estimated temperature of the damper fluid is lower than a nominal operating temperature, the temperature compensation signal from the temperature compensation module 116 may cause the damper force control module 112 to send a signal to the damper control mechanism 113 that causes the flow paths in the damper to exhibit less resistance to the flow of fluid. The lower resistance to flow may compensate for the higher viscosity of the cold fluid, and the damping force generated by the damper 102 may be substantially similar to a damping force that would be generated based on the desired damping force signal under normal operating temperature conditions.

Figure 2:
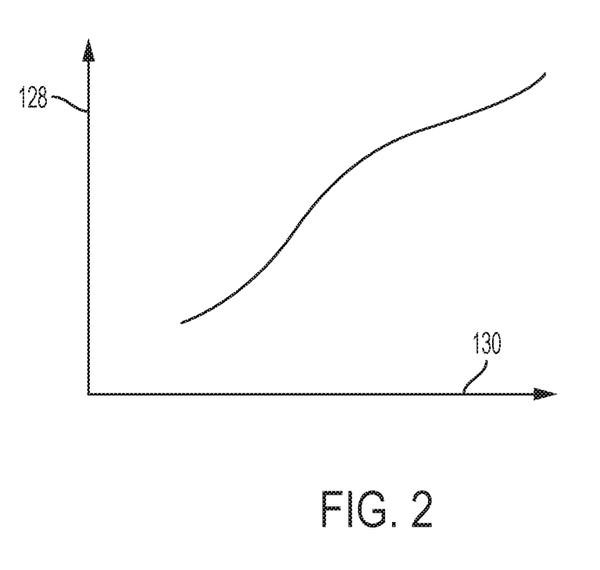
FIG. 2 is a diagram illustrating a relationship between damping force of a vehicle damper and a current applied to a damper control in accordance with an exemplary embodiment of the disclosed subject matter.

The damper force control mechanism 113 may be configured to alter the flow resistance (e.g., the size and/or number of fluid flow paths within the damper 102) in response to changes in current flowing through the damper control mechanism 113. For example, FIG. 2 is a plot showing damping force 128 as a function of current 130 applied to the damper control mechanism 113. As illustrated in FIG. 2, the damping force 128 may be at least generally proportional to the current 130 applied to the damper force control module. The relationship between the damping force 128 and the applied current 130 may be linear or non-linear, continuous or non-continuous, etc. As noted above, the damper control mechanism 113 may be or include one or more electromechanical devices such as solenoids, stepper motors, etc. configured to alter the size and/or number of fluid flow paths within the damper 102.

In some embodiments, the current 130 applied to the damper force control mechanism 113 may be proportional to an applied voltage. For example, a direct current (DC) voltage may be applied to the control mechanism 113, and an electrical resistance of the control mechanism 113 may determine the current flow 130 and the resulting damping force 128. In other embodiments, an alternating current (AC) voltage may be applied to the control mechanism 113, and an impedance of the control mechanism 113 may determine the current flow. In some embodiments, the signal applied to the electronic control unit 104 may be a digital signal. For example, the damper force control module 112 may provide a signal to the control mechanism 113 using, e.g., a pulse width modulation (PWM) scheme, or any other digital signal processing routine, to generate the desired current flow.

In some embodiments, the temperature compensation module 116 may be configured to generate a finite number of discrete compensating signal values, each associated with a range of estimated temperature inputs. For example, referring now to FIG. 3, a plot showing the nominal damping force signal 132 (i.e., a damping force signal from the damper force control module 112 with no temperature compensation input) plotted against a compensated damping force signal 133 (i.e., a damping force signal from the damper force control module 112 with a temperature compensation signal from the temperature compensation module 116) for three ranges of damper fluid temperatures is shown. Line 134 represents the output from the damper force control module 112 when the estimated temperature of the damper fluid is equal to a calibration temperature. The calibration temperature may represent a normal (e.g., equilibrium) operating temperature range which the damper fluid reaches during operation of the vehicle under normal ambient temperature conditions (e.g., about 20 degrees Celsius, between about 10 and about 30 degrees Celsius, etc.). When the temperature estimation module 114 estimates the fluid temperature is within the nominal temperature range, the temperature compensation module 116 may not send a signal, or may send a "zero" or "null" signal, to the damper force control module 112, and the signal from the damper force control module 112 may be based on the signal from the damping force calculation module 110 with no temperature compensation.

Figure 3:
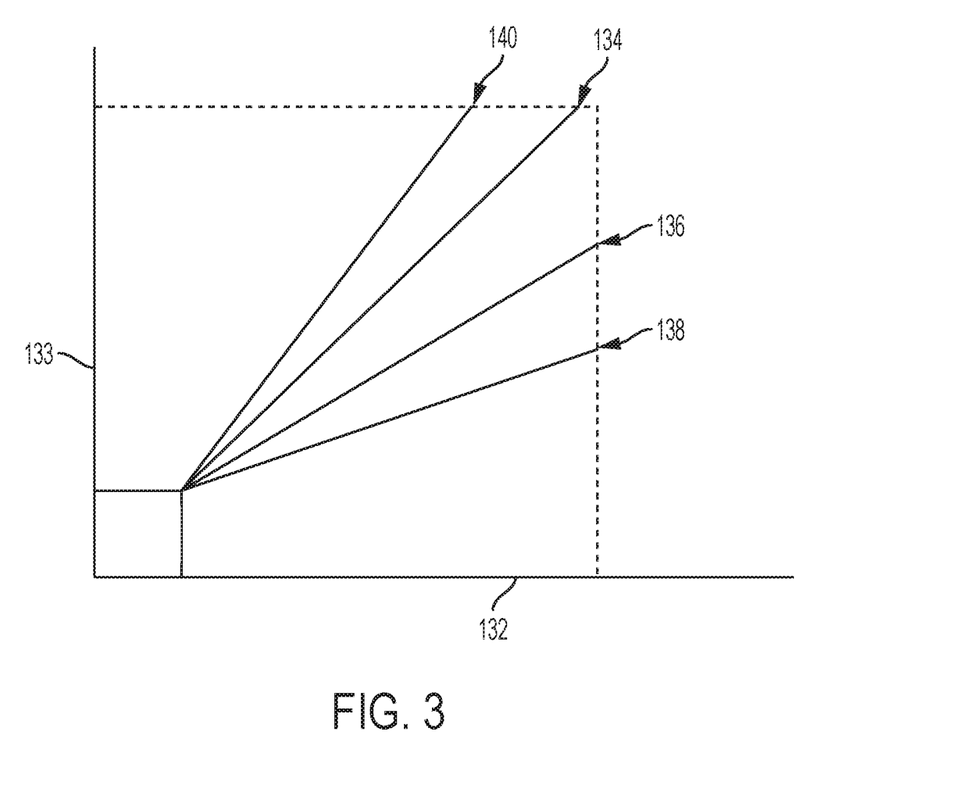
FIG. 3 is a diagram illustrating a relationship between a nominal current provided by an electronic control unit and a compensated current provided by the electronic control unit for different temperature conditions in accordance with an exemplary embodiment of the disclosed subject matter.

When the signal from the temperature estimation module 114 indicates the fluid temperature is below the nominal temperature range and within a low temperature range (e.g., below 0 degrees Celsius), the temperature compensation module 116 may send a compensation signal to the damper force control module 112, and the output from the damper force control module 112 may follow the line 136. The compensation signal results in a lower current being sent from the damper force control module 112. As described in connection with FIG. 2, the control mechanism 113 may provide a lower damping force in response to a lower current signal, thus compensating for the increased damping force generated by the high viscosity damper fluid.

Similarly, if the estimated damper fluid temperature drops below the "low" temperature range to a temperature within an even lower range of temperatures (e.g., below −18 degrees Celsius, below −30 degrees Celsius, etc.), the current may be reduced further, as shown by line 138, further increasing the size and/or number of fluid flow paths. Finally, if the damper fluid is estimated to be in a temperature range above the calibration temperature range, the current may be correspondingly increased, as shown by line 140. Increased temperature may correspond to a decrease in damper fluid viscosity, and relatively less damping force generated by the damper 102. Current flow to the control mechanism 113 may correspondingly be increased to increase the damping force provided by the damper 102 and compensate for the estimated high temperature of the damper fluid.

Figure 4:
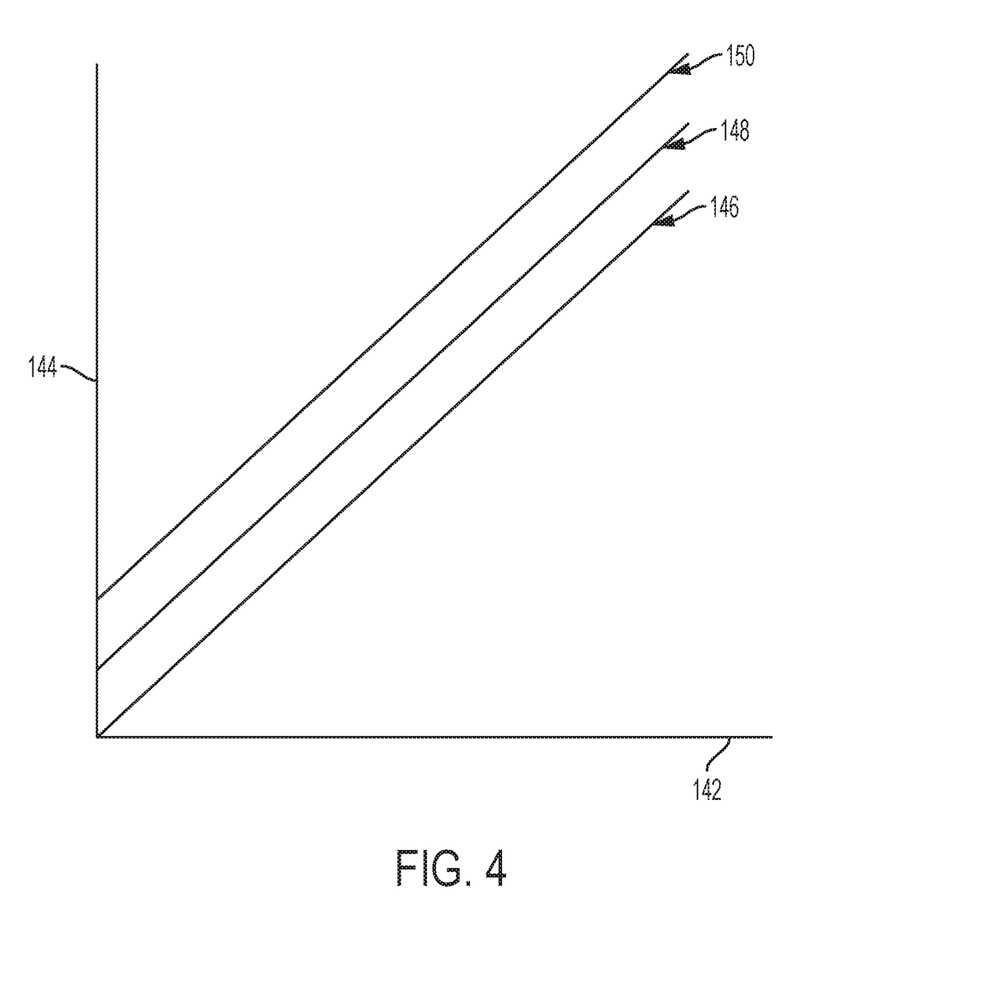
FIG. 4 is a diagram of damper temperature as a function of ambient temperature and other operating conditions.

Referring now to FIG. 4, a plot showing a correlation between ambient temperature 142 and damper fluid temperature 144 is shown for three different operating conditions 146, 148, and 150. Line 146 shows a proportional correlation between ambient temperature 142 and damper fluid temperature 144 when the vehicle is static. The temperature of the damper fluid may be equal to the ambient temperature, as heat is conducted to or from the damper fluid until the damper fluid reaches the ambient temperature. Line 148 shows a correlation between the ambient temperature 142 and the temperature of the damper fluid 144 when the vehicle is being operated over a moderately irregular surface (e.g., road). Articulation of the suspension in response to surface irregularities results in heat being added to the damper fluid and the temperature of the damper fluid may be greater than the ambient temperature. Finally, line 150 shows a relationship between ambient temperature and the temperature of the damper fluid when the vehicle is operated over a rough surface (e.g., a surface with more frequent and/or severe irregularities compared to the surface associated with line 148). Greater frequency and amplitude of suspension articulation may result in heat being added to the damper fluid at a greater rate compared to the conditions represented by line 148, and thus the temperature of the damper fluid is greater for a given ambient temperature. For the sake of simplicity, lines 148 and 150 show a generally linear relationship between ambient temperature and damper fluid temperature. In some embodiments, the relationship between ambient temperature and damper fluid temperature for the operating conditions represented by lines 148 and 150 may be non-linear.

Figure 5A:
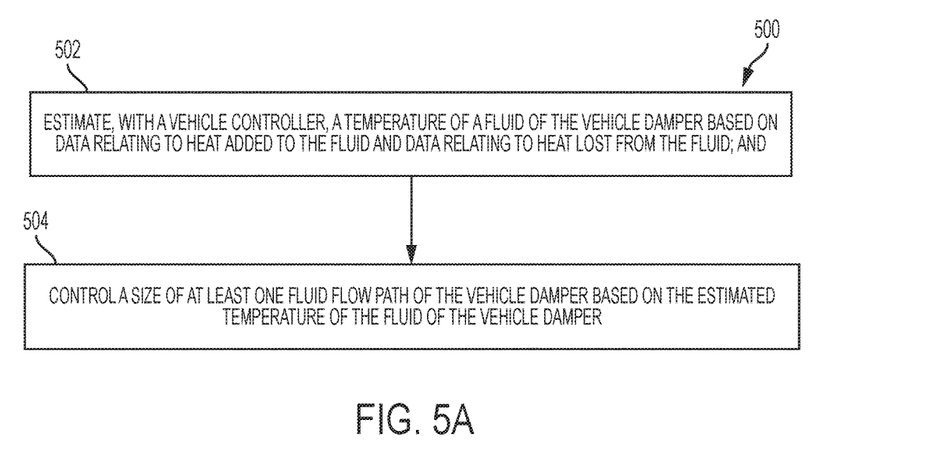
FIG. 5A is a flow chart illustrating a method of controlling a damping force of a vehicle damper in accordance with an exemplary embodiment of the disclosed subject matter.

FIG. 5A is a flow chart showing an exemplary method 500 of controlling a vehicle damper. The method 500 includes action 502 which comprises estimating, with a vehicle controller, a temperature of a fluid of the vehicle damper based on data relating to heat added to the fluid and data relating to heat lost from the fluid. Action 504 comprises controlling a size of at least one fluid flow path of the vehicle damper based on the estimated temperature of the fluid of the vehicle damper.

Figure 5B:
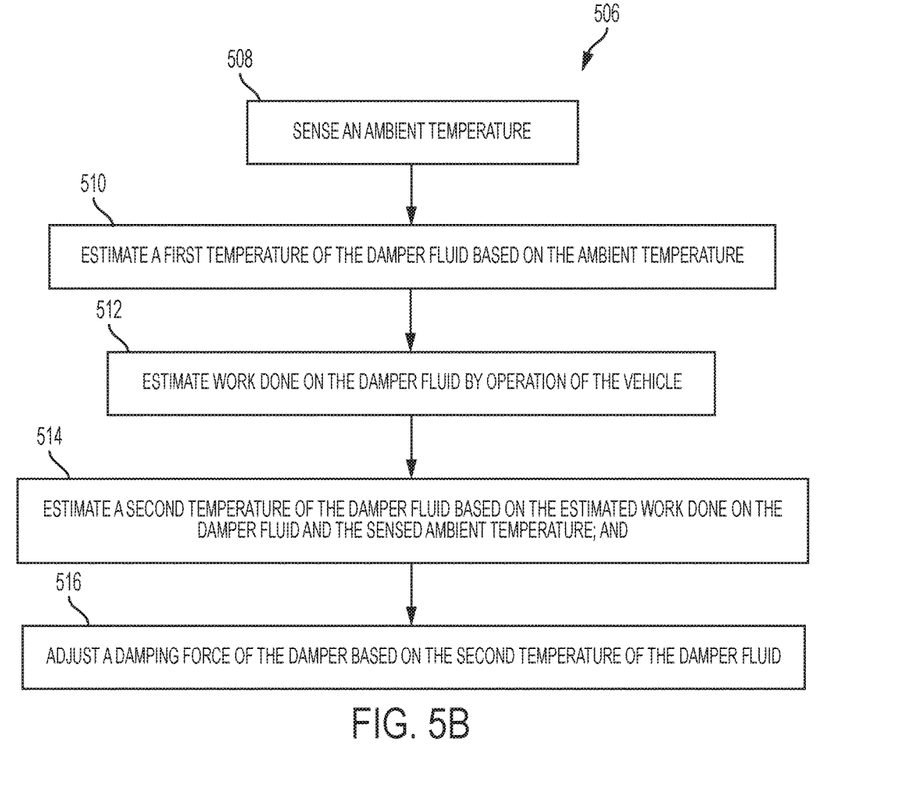
FIG. 5B is a flow chart illustrating a method of controlling a damping force of a vehicle damper in accordance with another exemplary embodiment of the disclosed subject matter.

FIG. 5B is a flow chart showing another exemplary method 506 of controlling a vehicle damper. The method 506 includes action 508, which comprises sensing an ambient temperature. In action 510, a first temperature of a damper fluid is estimated based on the ambient temperature. In action 512, a work done on the damper fluid by operation of the vehicle is estimated. In action 514, a second temperature of a damper fluid is estimated based on the estimated work done on the damper fluid and the sensed ambient temperature. In action 516, a damping force of the damper is adjusted based on the second temperature of the damper fluid.

In the description above, reference may be made to the electronic control unit (ECU) as a single component. However, this configuration is merely an example and is subject to a variety of implementation-specific variations. For example, in some embodiments, the functions described in reference to the ECU may be performed across multiple ECUs or among multiple components of the ECU. Further, the ECU may include one or more structural components that enable the ECU to function as a controller. The ECU, as well as any other controllers or processors disclosed herein, may include one or more non-transitory, tangible, machine-readable media, such as read-only memory (ROM), random access memory (RAM), solid state memory (e.g., flash memory), floppy diskettes, CD-ROMs, hard drives, universal serial bus (USB) drives, any other computer readable storage medium, or any combination thereof. The storage media may store encoded instructions, such as firmware, that may be executed by a control system of the controller to operate the logic or portions of the logic presented in the methods disclosed herein. For example, in certain embodiments, the ECU may include computer code disposed on a computer-readable storage medium or a process controller that includes such a computer-readable storage medium. The computer code may include instructions, data maps such as look-up-tables, and algorithms, for example, for carrying out the functions of one or more of the damper force calculation module 110, damper force control module 112, the temperature estimation module 114, and the temperature compensation module 116, based on feedback from the vehicle sensors described above, or other inputs.

Further modifications and alternative embodiments will be apparent to those of ordinary skill in the art in view of the disclosure herein. For example, the systems and the methods may include additional components or steps that were omitted from the diagrams and description for clarity of operation. Accordingly, this description is to be construed as illustrative only and is for the purpose of teaching those skilled in the art the general manner of carrying out the present teachings. It is to be understood that the various embodiments shown and described herein are to be taken as exemplary. Elements and materials, and arrangements of those elements and materials, may be substituted for those illustrated and described herein, parts and processes may be reversed, and certain features of the present teachings may be utilized independently, all as would be apparent to one skilled in the art after having the benefit of the description herein. Changes may be made in the elements described herein without departing from the spirit and scope of the present teachings and following claims.

This description and the accompanying drawing that illustrates exemplary embodiments of the present teachings should not be taken as limiting. Various mechanical, compositional, structural, electrical, and operational changes may be made without departing from the scope of this description and the claims, including equivalents. In some instances, well-known structures and techniques have not been shown or described in detail so as not to obscure the disclosure. Like numbers in two or more figures represent the same or similar elements. Furthermore, elements and their associated features that are described in detail with reference to one embodiment may, whenever practical, be included in other embodiments in which they are not specifically shown or described. For example, if an element is described in detail with reference to one embodiment and is not described with reference to a second embodiment, the element may nevertheless be claimed as included in the second embodiment.

For the purposes of this specification and appended claims, unless otherwise indicated, all numbers expressing quantities, percentages or proportions, and other numerical values used in the specification and claims, are to be understood as being modified in all instances by the term "about." Accordingly, unless indicated to the contrary, the numerical parameters set forth in the written description and claims are approximations that may vary depending upon the desired properties sought to be obtained by the present invention. At the very least, and not as an attempt to limit the application of the doctrine of equivalents to the scope of the claims, each numerical parameter should at least be construed in light of the number of reported significant digits and by applying ordinary rounding techniques.

It is noted that, as used in this specification and the appended claims, the singular forms "a," "an," and "the," include plural referents unless expressly and unequivocally limited to one referent. Thus, for example, reference to "a sensor" includes two or more different sensors. As used herein, the term "include" and its grammatical variants are intended to be non-limiting, such that recitation of items in a list is not to the exclusion of other like items that can be substituted or added to the listed items.

It will be apparent to those skilled in the art that various modifications and variations can be made to the system and method of the present disclosure without departing from the scope its disclosure. It is to be understood that the particular examples and embodiments set forth herein are non-limiting, and modifications to structure, dimensions, materials, and methodologies may be made without departing from the scope of the present teachings. Other embodiments of the disclosure will be apparent to those skilled in the art from consideration of the specification and practice of the disclosure disclosed herein. It is intended that the specification and embodiments described herein be considered as exemplary only.

What is claimed is:

1. A method of controlling a vehicle damper, comprising:
   estimating with a controller, a temperature of a fluid of the vehicle damper based on a sensed ambient temperature and sensed data relating to heat added to the fluid and heat lost from the fluid; and
   changing a size of at least one fluid flow path of the vehicle damper linearly in proportion to a change in the estimated temperature of the fluid of the vehicle damper.

2. The method of claim 1, further comprising transmitting data relating to heat added to the fluid of the vehicle damper to the controller.

3. The method of claim 2, wherein transmitting data relating to heat added to the fluid of the damper comprises transmitting data relating to a speed of the vehicle to the controller.

4. The method of claim 2, wherein transmitting data relating to heat added to the fluid of the vehicle damper comprises transmitting data relating to a wheel height of a wheel of the vehicle.

5. The method of claim 4, wherein transmitting data relating to heat added to the fluid of the vehicle damper comprises transmitting data relating to an amplitude of an oscillation of the wheel height of the vehicle.

6. The method of claim 5, wherein transmitting data relating to heat added to the fluid of the vehicle damper comprises transmitting data relating to a frequency of the oscillation of the wheel height of the vehicle.

7. The method of claim 1, further comprising transmitting data relating to heat lost from the fluid of the vehicle damper to the controller.

8. The method of claim 7, wherein transmitting data relating to heat lost from the fluid of the vehicle damper comprises transmitting data relating to an ambient air temperature.

9. The method of claim 7, wherein transmitting data relating to heat lost from the fluid of the vehicle damper comprises transmitting data relating to a speed of the vehicle.

10. The method of claim 1, wherein changing a size of at least one fluid flow path of the vehicle damper in proportion to a change in the estimated temperature comprises increasing a size of the at least one fluid flow path in proportion to a decrease in the estimated temperature.

11. A damper control system, comprising:
    a controller configured to estimate a temperature of a damper fluid based on a sensed ambient temperature and data relating to heat added to and heat removed from the fluid; and
    at least one damper operatively coupled to the controller, wherein the controller is configured to continuously change a size of a damper flow path of the at least one damper in proportion to a change in the estimated temperature.

12. The system of claim 10, wherein at least one of the data relating to heat added to and heat removed from the fluid comprises data related to at least one of a frequency of an oscillation of a height of a wheel, an amplitude of the oscillation of the height of the wheel, and an ambient air temperature.

13. The system of claim 11, wherein the controller is configured to estimate the temperature of the damper fluid based on inputs from sensors not in direct contact with the damper fluid.

14. The system of claim 11, wherein the damper fluid comprises oil.

15. The damper control system of claim 11, wherein the controller is configured to increase a size of a damper flow path of the at least one damper in proportion to a decrease in the estimated temperature.

16. A vehicle having a suspension control system, comprising:
    a suspension damper;
    a controller comprising:
      a damping force calculation module configured to output a signal relating to a desired damping force;
      a temperature estimation module configured to provide an estimated damper fluid temperature;
      a temperature compensation module configured to output a temperature compensation signal relating to the estimated damper fluid temperature; and
      a damping force control module configured to continuously adjust a parameter of the suspension damper based on the desired damping force signal and in proportion to the temperature compensation signal.

17. The system of claim 16, wherein the damping force calculation module is configured to calculate desired damping force based on at last one of vehicle speed, steering angle, lateral acceleration, longitudinal acceleration, and wheel height of at least one wheel of the vehicle.

18. The system of claim 16, wherein the temperature estimation module is configured to estimate the damper fluid temperature based on at least one of ambient air temperature and wheel height of at least one wheel of the vehicle.

19. The system of claim 18, wherein the temperature estimation module is further configured to estimate the damper fluid temperature based on data related to an amplitude of an oscillation of the height of the at least one wheel.

20. The system of claim 18, wherein the temperature estimation module is configured to estimate the damper fluid temperature based on data related to a frequency of an oscillation of the height of the at least one wheel.

21. The system of claim 16, wherein the temperature estimation module is further configured to calculate a rate of heat loss from the damper fluid based at least on data related to the ambient air temperature.

22. The system of claim 16, wherein the temperature estimation module is configured to calculate a rate of heat addition to the damper fluid based at least on data related to a speed of the vehicle.

* * * * *